E. C. PICKERING.
Balances.
No. 144,286.
Patented Nov. 4, 1873.
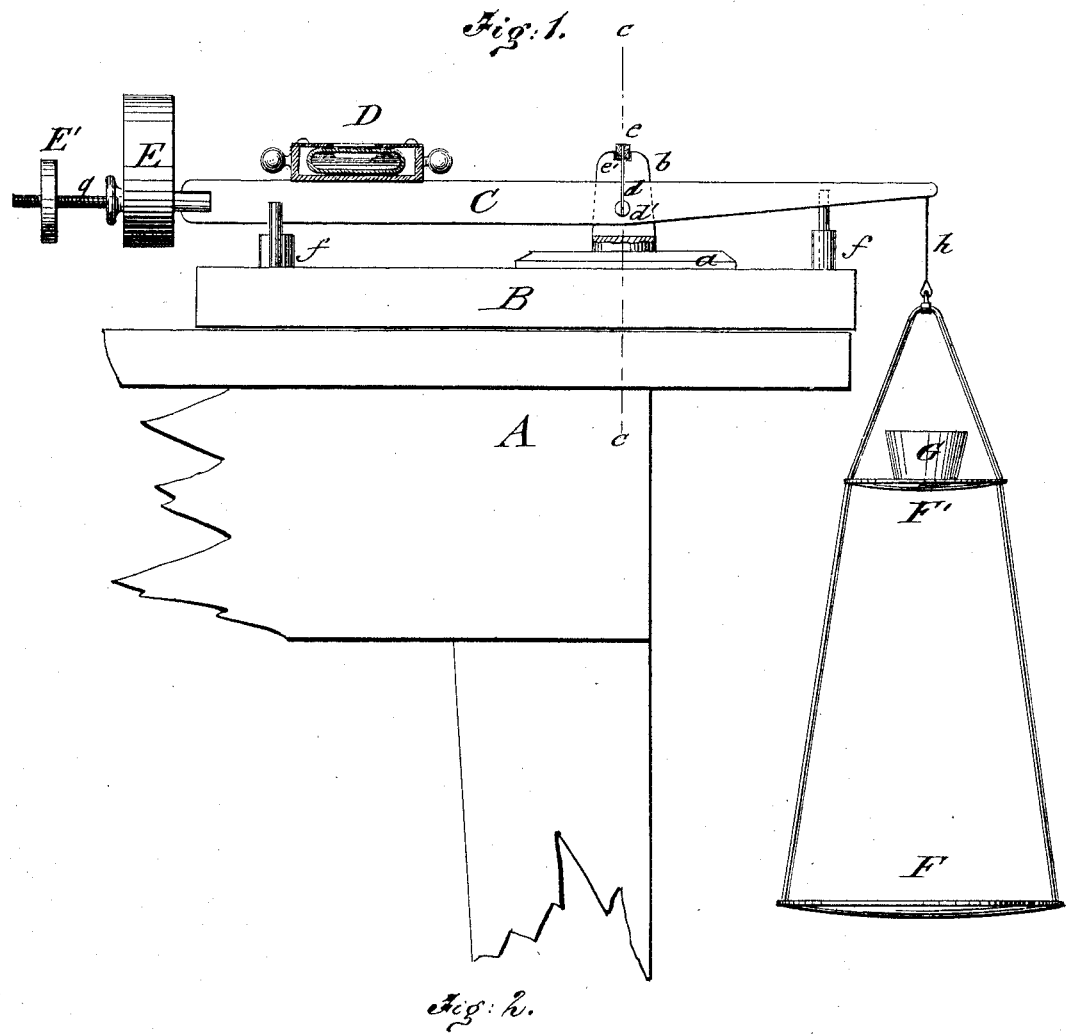
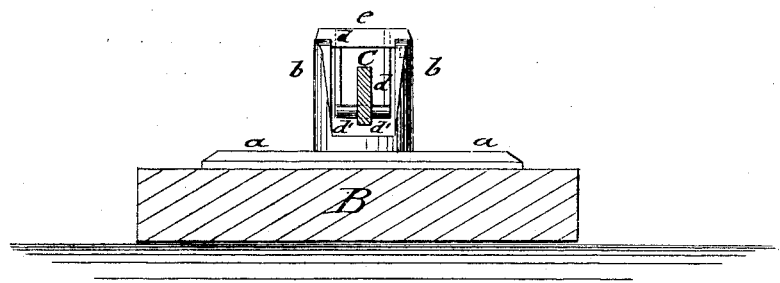

UNITED STATES PATENT OFFICE.

EDWARD C. PICKERING, OF BOSTON, MASSACHUSETTS.

IMPROVEMENT IN BALANCES.

Specification forming part of Letters Patent No. 144,286, dated November 4, 1873; application filed August 9, 1873.

*To all whom it may concern:*

Be it known that I, EDWARD C. PICKERING, of Boston, in the county of Suffolk and State of Massachusetts, have invented a new and Improved Balance, of which the following is a specification:

In the accompanying drawing, Figure 1 represents a side elevation of my improved balance; and Fig. 2 a vertical transverse section of the same on the line $c\ c$, Fig. 1, showing method of suspending scale-beam.

Similar letters of reference indicate corresponding parts.

The object of my invention is to produce, for the purposes of scientific investigation and the use of the public in general, an improved balance, which combines simplicity and cheapness of construction with accuracy, sensibility, and durability. The invention consists in arranging a spirit-level and adjustable weights with one end of a scale-beam carrying a weighing-pan at its opposite end, as hereinafter described.

In the drawing, A represents a table, standard, or other suitable support for the balance, on which is placed the base-frame B, which carries a connecting-plate, $a$, screwed to frame B with pillars $b$. The scale-beam C is suspended between pillars $b$ by means of two watch-springs, $d$, which are attached to lugs $d'$ of beam C, and to the lateral piece $e$, placed in suitable recesses $e'$ of pillars $b$.

By the use of elastic wire or springs instead of the knife-edges all danger of rusting or dulling the edge is avoided, and the motion of the scale-beam rendered nearly free from friction. As the springs are straight when the beam is level, no error is introduced even if they become weakened from rust or other causes. The effect of the elasticity of the springs, when the beam is tipped, is also neutralized by raising the center of gravity.

Stops and guides $f$, at each of the pillars $b$, arrest the motion of beam C when tipped to either side. A spirit-level, D, is secured to the beam C, which indicates the horizontal position of the same, and the equal balancing of the weights at the ends of the beam, when the bubble plays in the center. A weight, E, is applied to one end of beam C, together with a screw, $g$, on which the adjusting-weight E' turns. To the other end of beam C is suspended, by an elastic flexible wire, $h$, the scale-pan F, which has a second pan, F', for the weights to be placed on it.

All the weights G, large and small, are put on the scale-pan F', which will then balance the weight E of the beam, so that the bubble of the level D will come to the center of the tube. If not, adjust the loose nut or weight E' till the exact balance of the weights is obtained. The body to be weighed is then placed on pan F, and the weights G removed gradually from pan F' until the bubble is again in the center. The weights removed are equal to the weight of the body. The weights G may also be taken off and added in the usual way till the beam is again horizontal. Those remaining give the weight of the body.

Having thus described my invention, I claim as new and desire to secure by Letters Patent—

In combination with base-frame B and pillars $b$, the scale-beam C, with spirit-level D and adjustable weights E E' at one end, and scale-pans F F' at the other end, substantially as and for the purpose described.

EDWARD C. PICKERING.

Witnesses:
 MIRON J. HAZELTINE,
 H. BRYANT HAZELTINE.